United States Patent [19]

Graff et al.

[11] Patent Number: 4,973,521
[45] Date of Patent: * Nov. 27, 1990

[54] MANUFACTURE OF BONDED STRUCTURES

[75] Inventors: John M. Graff, West Suffield; Leon Stoltze, East Hartland, both of Conn.

[73] Assignee: United Technologies Corporation, Hartford, Conn.

[*] Notice: The portion of the term of this patent subsequent to Aug. 15, 2006 has been disclaimed.

[21] Appl. No.: 222,291

[22] Filed: Jul. 21, 1988

Related U.S. Application Data

[63] Continuation of Ser. No. 814,422, Dec. 30, 1985, abandoned.

[51] Int. Cl.$^5$ .............................................. B32B 15/14
[52] U.S. Cl. ..................................... 428/608; 416/230
[58] Field of Search ...................... 426/608, 614, 596; 29/156.8 B; 416/241 R, 230

[56] References Cited

U.S. PATENT DOCUMENTS

| | | | |
|---|---|---|---|
| 3,144,370 | 8/1964 | Bennett et al. | 428/608 |
| 3,371,407 | 3/1968 | Forsyth et al. | 428/608 |
| 3,660,052 | 5/1972 | Takamatsu et al. | 428/608 |
| 3,762,835 | 10/1973 | Carlson et al. | 416/224 |
| 3,936,277 | 2/1976 | Jakway et al. | 428/608 |
| 4,040,770 | 8/1977 | Carlson | 428/608 |
| 4,043,703 | 8/1977 | Carlson | 428/608 |
| 4,091,146 | 5/1978 | Darrow et al. | 416/241 R |
| 4,589,176 | 5/1986 | Rosman et al. | 416/241 R |

Primary Examiner—John J. Zimmerman

[57] ABSTRACT

Bonding pressure is uniformly applied to the lay-up (70) of a bonded product (10) by the disposition of flexible, compressible, perforated sheet material (85) within the lay-up during the manufacture of the product by diffusion bonding.

8 Claims, 4 Drawing Sheets

MANUFACTURE OF BONDED STRUCTURES

IMPROVEMENT IN THE FABRICATION OF BONDED STRUCTURES

The Government has rights in this invention pursuant to Contract No. F33657-79-C-0504 awarded by the Department of the Air Force.

This application is a continuation of Ser. No. 814,422, filed Dec. 30, 1985, now abandoned.

TECHNICAL FIELD

This invention relates generally to the manufacture of bonded structures and particularly to enhancing the uniformity of the application of bonding pressure to such structures.

BACKGROUND ART

Methods of manufacture which involve the machining of an article from homogeneous material have, in large measure, given way to modern manufacturing techniques wherein an end product is produced by bonding a plurality of constituent components under conditions of elevated pressure and often, elevated temperature. By way of example, airfoils such as those employed in aircraft propellers are often manufactured from high strength composite constituents such as plies of fiberglass reinforced epoxy resin which are layed up and then bonded together within a mold having a cavity corresponding to the desired airfoil geometry. Recently, diffusion bonding of composites such as boron reinforced aluminum has received attention as an alternative to the machining of airfoils such as gas turbine engine fans, from high strength metals.

Those skilled in the art will recognize that the application of insufficient bonding pressure to portions of a composite lay-up in a diffusion bonding process, will result in weakened areas in the product produced thereby. Unformity in bonding pressure is a function of conformity of the lay-up to a predetermined, nominal shape. Therefore, nonuniformity in the thicknesses of the composite constituents can lead to substantial nonconformity of the lay-up to such a nominal shape and nonuniformity in the application of bonding pressure to the lay-up. Thus, variations in the thicknesses of the constituent composite plies due to normal tolerances in the manufacture thereof, can result in the application of insufficient bonding pressure to the lay-up and, therefore, inadequate structural integrity of the end product. Accordingly, in manufacturing processes such as the diffusion bonding of metallic composites wherein an assembly of constituents are bonded together within a mold under conditions of elevated pressure, a mechanism for evenly distributing bonding pressure in the face of deviation in constituent dimensions from nominal dimensions, is required.

DISCLOSURE OF INVENTION

It is therefore, among the objects of the present invention to provide an improved bonded product wherein an assembly of constituents exhibiting geometrical variations from nominal, is bonded under conditions of uniformly distributed bonding pressures for the enhancement of the structural integrity of an end product.

In accordance with the present invention, bonding pressures are evenly distributed over a lay-up of constituents such as composite plies by the disposition of a flexible, compressible perforated sheet material within the lay-up. Where sufficient bonding pressures exist, the material of the sheet compresses in thickness and expands into adjacent perforations thereof to provide a path for the application of bonding pressure to those portions of the lay-up which would otherwise receive insufficient bonding pressure due to deviation in constituent dimensions from nominal. In the preferred embodiment, the bonding method comprises diffusion bonding wherein layers of composites such as boron fiber reinforced aluminum are bonded to one another and the flexible, compressible perforated sheet material comprises a woven aluminum mesh. Those portions of the mesh where aluminum strands cross over one another are compressed and spread to adjacent areas of single strand thickness and into the mesh perforations to provide the paths for the distribution of bonding forces from the molds to the composite layers.

BEST MODE FOR CARRYING OUT THE INVENTION AND

INDUSTRIAL APPLICABILITY THEREOF

Figure 1:
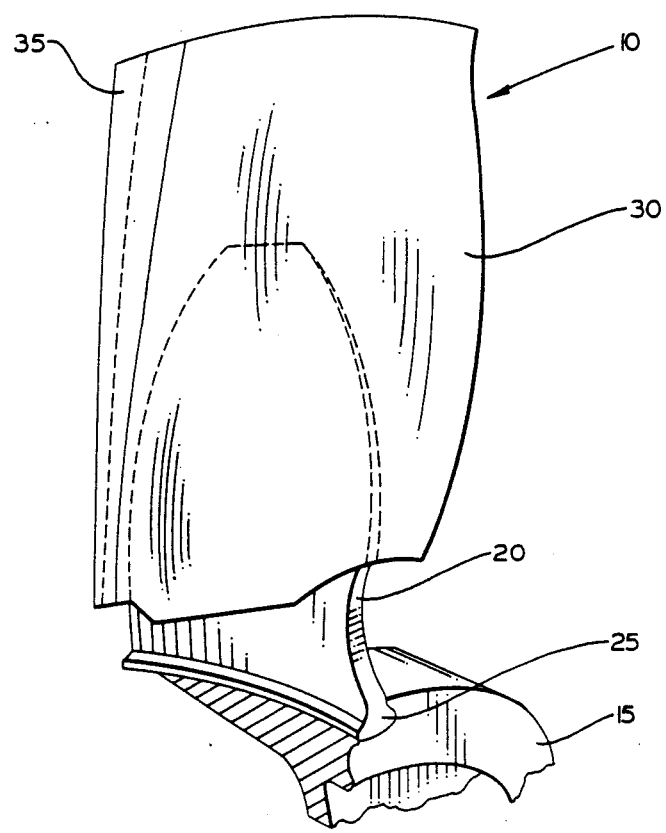
FIG. 1 is a perspective view of a gas turbine engine fan blade manufactured in accordance with the present invention.

Referring to FIG. 1, there is shown a gas turbine engine fan blade 10 mounted on a rotatable hub 15. Blade 10 is of the "spar-shell" variety, comprising a high strength spar 20 of titanium or the like having a dovetail root end 25 which fits within a mating slot in hub 15. Blade 10 also includes a composite shell 30 bonded to the spar and covered at the leading edge thereof with a sheath 35.

Figure 2:
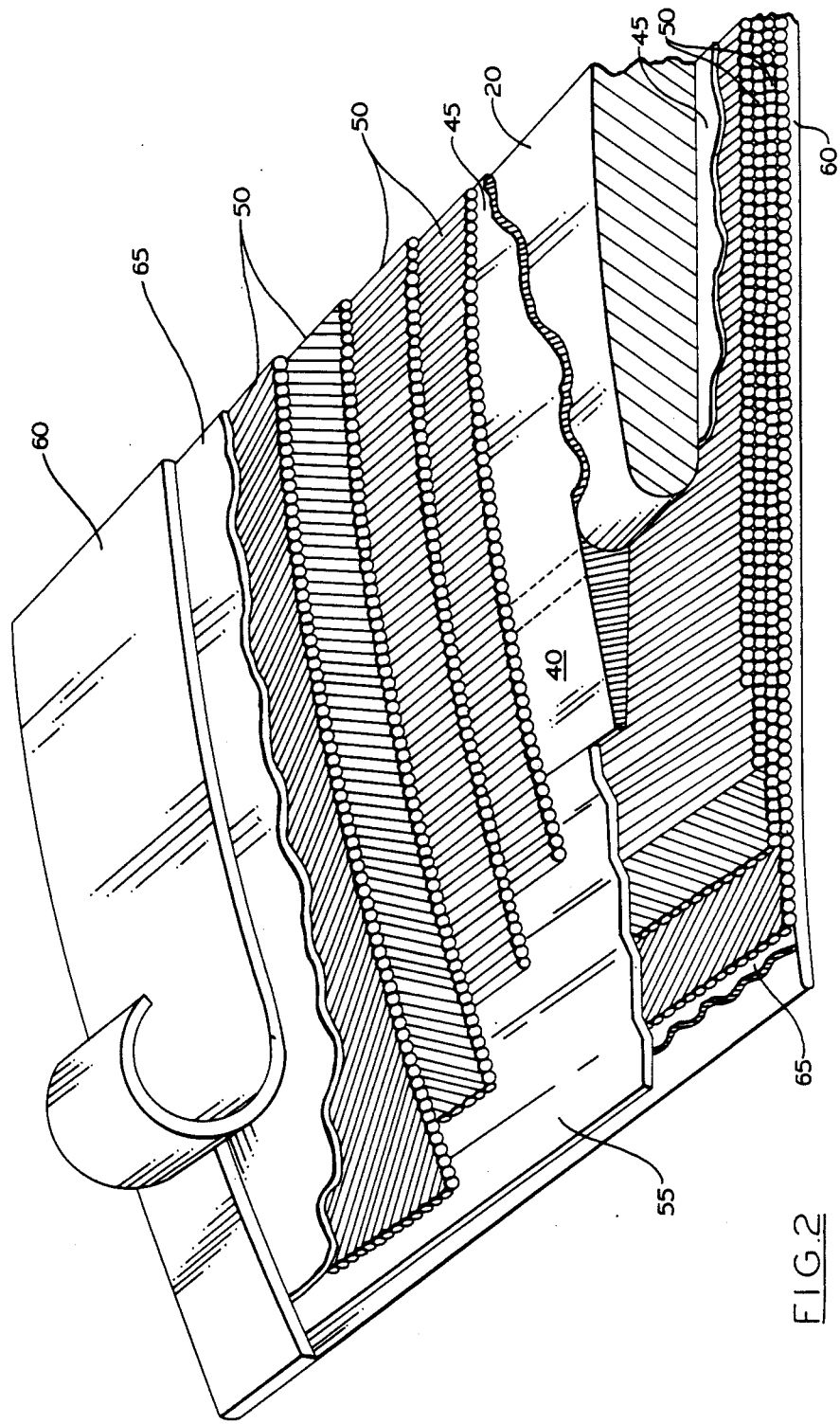
FIG. 2 is an enlarged fragmentary view of a portion of the blade of FIG. 1, portions thereof having been removed to illustrate details of the structure thereof.

For purposes of economy of manufacture and to achieve high strength-to-weight ratios, shell 30 is formed from a plurality of high strength composite plies bonded to the spar by diffusion bonding techniques. Referring to FIG. 2, titanium spar 20 is disposed interiorly of shell 30, at the leading edge of a solid aluminum fill piece (shim) 40. Sheets of aluminum foil 45 overlie spar 20 along the major surfaces thereof and provide bonding material for a diffusion bond between the spar and adjacent layers 50 of composite material. The composite layers comprise thin sheets of an aluminum matrix having strands of boron embedded therein. As illustrated, the composite sheets may be layed up over the spar and fill piece 40 with any suitable relative angular orientation of the boron fibers. While FIG. 2 illustrates only four layers of composite covering the spar, it will be understood that any suitable number of layers may be employed. An aluminum bonding foil sheet 55 disposed adjacent to the trailing edge of fill piece 40, provides bonding material for the diffusion bond between the composite plies and titanium outer skin layers 60 at the trailing edge of the blade. Aluminum bonding foil sheets 65 which overlie composite 50, provide material for the bonding of outer skin layers 60 to the underlying composite sheets.

Blade 10 is manufactured by first forming a subassembly of spar 20 and fill piece 40, the mating shapes of these components being formed by any suitable means such as machining. The spar and fill piece are then diffusion bonded together under conditions of elevated pressure and temperature. The spar-fill piece subassembly is then layed up with the various layers of bonding foil, composite sheets and skin as described with respect to FIG. 2 to form a blade lay-up 70 which (FIG. 3) is then placed within mold halves 75 and 80. The various metallic and composite layers in lay-up 70 are then diffusion bonded within mold halves 75 and 80 under conditions of elevated temperature (960-990° F.) and pressure (6000-9000 psi) to form the fan blade illustrated in FIG. 1.

As set forth hereinabove, to assure structural integrity of the blade, it is necessary that sufficient bonding pressure be evenly distributed over the entire lay-up. As further set forth hereinabove, dimensional variations in the thicknesses of the constituent plies can result in areas of the lay-up deviating in thickness from a nominal thickness. This in turn can result in failure of the thinner than nominal portions of the lay-up to receive adquate bonding pressure, whereby these portions are inadequately bonded in the end product.

Figure 3:
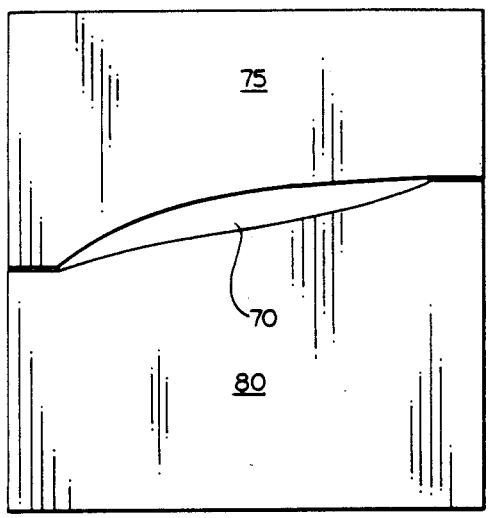
FIG. 3 is an elevation of a pressure bonding process being performed in accordance with the present invention.
Figure 4:
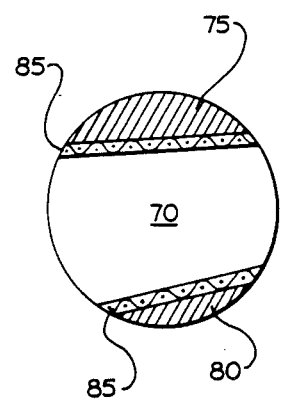
FIG. 4 is a fragmentary enlargement of a portion of FIG. 3.
Figure 5:
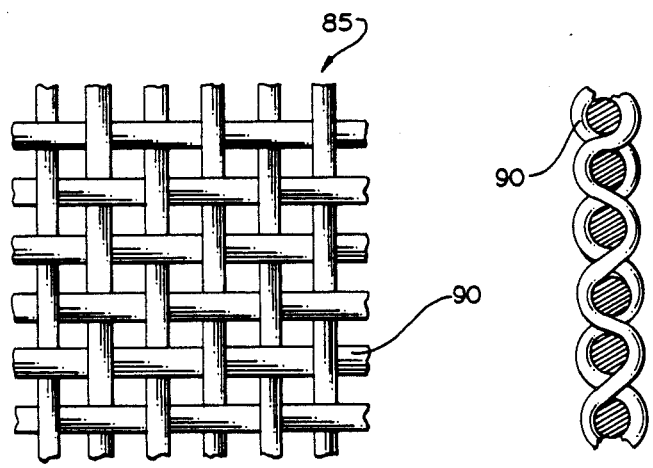
FIG. 5 is a plan view of a woven wire mesh employed in the bonding process illustrated in FIGS. 3 and 4.
Figure 6:
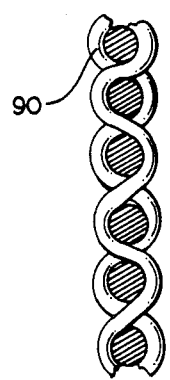
FIG. 6 is an edge view of the woven mesh illustrated in FIG. 5.

To evenly distribute adequate bonding pressure over lay-up 70, as illustrated in FIGS. 3 and 4, flexible, compressible, perforated sheet material 85 is inserted between lay-up 70 and the mold halves prior to the actual diffusion bonding of the constituents. Thus, the diffusion bonding force is applied to lay-up 70 from mold halves 75 and 80 through the perforated sheet material. As illustrated in FIGS. 5 and 6, the sheet material may comprise a woven mesh of aluminum strands 90. In the preferred embodiment, with the various plies being formed from the noted materials, woven mesh 85 comprises AA6061, 0.014 inch diameter aluminum wires in a 22 by 22 wire per inch distribution. It will be seen that diffusion bonding pressure applied by mold halves 75 and 80 will first be exerted on the thicker than nominal areas of the lay-up, first deforming the wire crossovers (those portions of the mesh where adjacent strands cross one another). This results in compressive yielding (widening) of the crossovers into those areas of single strand thickness and eventually into the open (perforated) areas between the strands. Such strand yielding establishes continuous paths for the application of bonding force from the mold halves to any thinner than nominal portions of lay-up 70. This in turn increases the uniformity of the application of bonding pressure to the entire lay-up, thereby minimizing the risk of weakend areas therein.

Those skilled in the art will appreciate that a calibration of mesh porosity, versus mesh thickness, versus applied bonding pressure may be emperically established for purposes of substantiating the adequacy of bonding pressure applied to a lay-up formed from materials of specified thickness tolerance. In a somewhat similar vein, conformity of dies to a desired shape may be substantiated by use of mesh 85. In such case, a finished product of predetermined geometry would be compressed with the mesh disposed between the product and a pair of dies to be checked. Variations in mesh thickness and porosity under conditions of the application of a predetermined bonding force would indicate deviation of die shape from a desired product geometry.

Figure 7:
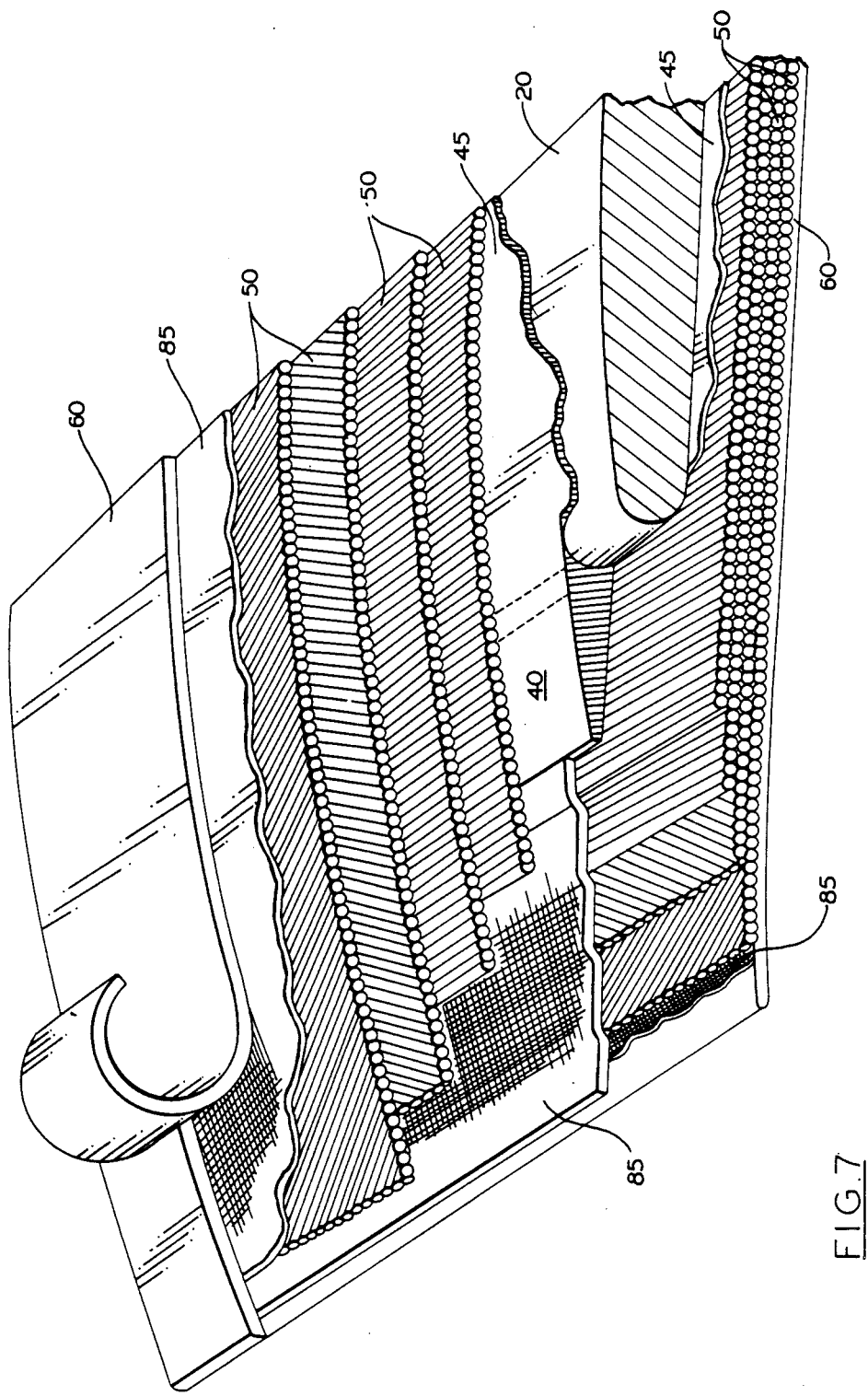
FIG. 7 is a view similar to that of FIG. 2, but illustrating a alternate blade manufactured in accordance with the present invention.

Referring to FIG. 7, enhanced uniformity in the application of bonding pressure to the lay up may also be achieved by the disposition of the wire mesh within the blade itself. In this case, mesh 85 is substituted for the bonding foils beneath the titanium skin and at the trailing edge of aluminum fill piece 40. When so disposed, mesh 85 not only yields in the manner described hereinabove, to provide continuous force application paths from the mold halves to the lay-up, but also provides material for the bonding of the various constituents to one another in the manner of foils 55 and 65 which the mesh replaces within the finished blade.

While specific embodiments of the present invention have been described and illustrated, it will be understood that various modifications thereof may suggest themselves to those skilled in the art. For example, while the invention herein has been described within the context of the manufacture of a metallic composite fan blade, it will be understood that this invention has equal utility in the manufacture of any product by means of molding constituents of any composition with elevated pressures. Therefore, while an aluminum wire mesh has been disclosed, any of various other flexible, compressible, perforated sheet materials may be employed as is dictated by the nature of the constituents. Accordingly, it will be understood that the following claims cover all modifications which fall within the true spirit and scope of the invention herein.

Having thus described the invention what is claimed is:

1. In an article manufactured by the compression molding of a lay-up of constituents having an aggregate uncompressed thickness dimension, under conditions of elevated pressures within a mold having an interior shape corresponding to the desired shape of said article, the improvement characterized by:
   relatively soft, flexible perforated sheet material disposed within said article, adjacent to at least one of said constituents, the thickness of said perforated sheet material, under said compression molding conditions, being compressively deformable in a manner in which select portions of said sheet material expand into adjacent perforations thereof, for enhancing the uniformity of pressure distribution during sad compression molding from said mold, through said sheet material, to portions of said lay-up which deviate from said uncompressed thickness dimension.

2. The article of claim 1 characterized by said constituents comprising composite sheets of high strength filaments disposed within a matrix.

3. The article of claim 2 characterized by said sheet material comprising a woven fabric mesh.

4. The article of claim 3 characterized by said filaments, said matrix and said woven fabric mesh being metallic.

5. The article of claim 4 characterized by said matrix and woven fabric mesh comprising aluminum.

6. The article of claim 1 characterized by said article comprising a fan blade, said constituents comprising composite sheets of high-strength filaments disposed in a metallic matrix, said lay-up of said sheets being covered by a metallic skin and said sheet material comprising a woven fabric mesh formed from metallic strands, said mesh being disposed between said skin and an outermost one of said composite sheets.

7. The fan blade of claim 6 characterized by said woven fabric mesh being further disposed interiorly of said lay-up of said composite sheets.

8. The fan blade of claims 6 or 7 characterized by said high-strength filaments being formed from boron, said metallic matrix being formed from aluminum and said metallic strands being formed from aluminum.

* * * * *